United States Patent
Hao et al.

(10) Patent No.: US 11,626,961 B2
(45) Date of Patent: Apr. 11, 2023

(54) CHANNEL STATE INFORMATION (CSI) MEASUREMENT WITH DIFFERENT QUASI-COLOCATION (QCL) CONFIGURATIONS FOR A SAME CSI REFERENCE SIGNAL (CSI-RS) RESOURCE

(71) Applicant: QUALCOMM Incorporated, San Diego, CA (US)

(72) Inventors: Chenxi Hao, Beijing (CN); Yu Zhang, Beijing (CN); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/289,531

(22) PCT Filed: Oct. 31, 2019

(86) PCT No.: PCT/CN2019/114814
§ 371 (c)(1),
(2) Date: Apr. 28, 2021

(87) PCT Pub. No.: WO2020/088607
PCT Pub. Date: May 7, 2020

(65) Prior Publication Data
US 2021/0399861 A1   Dec. 23, 2021

(30) Foreign Application Priority Data
Nov. 2, 2018  (WO) ................ PCT/CN2018/113575

(51) Int. Cl.
*H04L 5/00* (2006.01)
*H04W 24/10* (2009.01)

(52) U.S. Cl.
CPC ........... *H04L 5/0057* (2013.01); *H04W 24/10* (2013.01)

(58) Field of Classification Search
CPC ............................. H04L 5/0057; H04W 24/10
USPC ......................................................... 370/329
See application file for complete search history.

(56) References Cited

U.S. PATENT DOCUMENTS

2015/0280878 A1\* 10/2015 Lee ....................... H04L 5/0048
                                                              370/252
2019/0174466 A1\*  6/2019 Zhang .................... H04L 5/005

FOREIGN PATENT DOCUMENTS

| CN | 105471559 A | 4/2016 |
| CN | 108092754 A | 5/2018 |
| CN | 108631984 A | 10/2018 |
| CN | 108696346 A | 10/2018 |

(Continued)

OTHER PUBLICATIONS

Supplementary European Search Report—EP19879258—Search Authority—Munich—dated Jul. 1, 2022.

(Continued)

*Primary Examiner* — Christopher R Crompton
(74) *Attorney, Agent, or Firm* — Patterson & Sheridan, LLP

(57) ABSTRACT

Certain aspects of the present disclosure relate to methods and apparatus for providing quasi-colocation (QCL) signaling for reference signals (RS) and channels across scenarios involving multiple cells, such as coordinated multipoint (CoMP) scenarios in which multiple transmit receive points (TRPs) or integrated access and backhaul (IAB) nodes each have their own cell ID.

30 Claims, 10 Drawing Sheets

(56) References Cited

FOREIGN PATENT DOCUMENTS

WO    2018172001 A1    9/2018
WO    2018174552 A1    9/2018

OTHER PUBLICATIONS

ZTE: "Maintenance for CSI Acquisition", 3GPP Draft, 3GPP TSG RAN WG1 Meeting #94bis, R1-1810213, Maintenance for CSI Acquisition, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517629, 5 Pages, Retrieved from the Internet: URL: http://www.3gpp.org/ftp/tsg%5Fran/WG1%5FRL1/TSGR1%5F94b/Docs/R1%2D1810213%2Ezip [Retrieved on Sep. 29, 2018].

ZTE: "Feature Lead Summary on CSI Measurement", 3GPP Draft, 3GPP TSG-RAN WG1 Meeting #94bis, R1-1811858 Feature Lead Summary on CSI Measurement, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018 Oct. 9, 2018 (Oct. 9, 2018), XP051519182, 15 Pages, Section 2.

Ericsson: "Maintenance for RS and QCL", 3GPP TSG-RAN WG1 Meeting #94, R1-1809198, Aug. 24, 2018 (Aug. 24, 2018), pp. 1-6, the whole document.

International Search Report and Written Opinion—PCT/CN2018/113575—ISA/EPO—dated Jul. 25, 2019.

International Search Report and Written Opinion—PCT/CN2019/114814—ISA/EPO—dated Feb. 1, 2020.

OPPO: "Text proposals for Beam management", 3GPP TSG RAN WG1 Meeting #94bis, R1-1810971, Oct. 12, 2018 (Oct. 12, 2018), 7 Pages.

Qualcomm Incorporated: "Details on simultaneous reception/transmission of PHY channels and RS in FR2", 3GPP TSG RAN WG1 Meeting #94, R1-1809425, Aug. 24, 2018 (Aug. 24, 2018), pp. 1-6, sections 2,4.

ZTE: "Maintenance for Beam Management," 3GPP Draft, 3GPP TSG RAN WG1 Meeting #94bis, R1-1810214, Maintenance for Beam Management, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517630,11 pages.

\* cited by examiner

```
TCI-State ::=
  tci-stateid
  qcl-type1,
  qcl-type2                    sequence {
                                 TCI-StateId,
                                 QCL-Info,
                                 QCL-Info                OPTIONAL
                               }
                                 ...
                               }

QCL-Info ::= sequence {
  cell
  ...                          ENUMERATED {n1, n2}
  bwp-id
  reference-signal             sequence {
    csi-rs                       ServCellIndex            OPTIONAL,
    ssb                          BWP-Id                   OPTIONAL,
    csi-rs-for-tracking          CHOICE {
  ...                              NZP-CSI-RS-ResourceId,
  qcl-type                         SSB-Index,
                                   NZP-CSI-RS-ResourceId
                                 },
                                 ENUMERATED {typeA, typeB, typeC, typeD}
                               }
```

FIG. 7

CHANNEL STATE INFORMATION (CSI) MEASUREMENT WITH DIFFERENT QUASI-COLOCATION (QCL) CONFIGURATIONS FOR A SAME CSI REFERENCE SIGNAL (CSI-RS) RESOURCE

CROSS REFERENCE TO RELATED APPLICATIONS

This application is a national stage application under 35 U.S.C. 371 of PCT/CN2019/114814, filed Oct. 31, 2019, which claims priority to International Application No. PCT/CN2018/113575 filed Nov. 2, 2018, which are assigned to the assignee of the present application and is expressly incorporated by reference herein in their entireties.

FIELD

The present disclosure relates generally to communication systems, and more particularly, to methods and apparatus for measuring and reporting channel state information based on CSI reference signals (CSI-RS) transmitted on a CSI-RS resource having different QCL configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes obtaining a channel state information (CSI) reporting configuration indicating different quasi-colocation (QCL) assumptions for a common reference signal (RS) resource included in at least first and second resource sets, detecting aperiodic CSI report triggering states indicating a first slot offset for the first resource set and a second slot offset for the second resource set, determining if the CSI reporting configuration is valid or invalid, based on at least one condition, sending a CSI report for at least one of the first resource set or the second resource set, in accordance with the determination.

Certain aspects provide a method for wireless communications by a user equipment. The method generally includes configuring a user equipment (UE) with a channel state information (CSI) reporting configuration indicating different quasi-colocation (QCL) assumptions for a common reference signal (RS) resource included in at least first and second resource sets, triggering aperiodic CSI reports via triggering states indicating a first slot offset for the first resource set and a second slot offset for the second resource set, determining if the CSI reporting configuration is valid or invalid, based on at least one condition, and processing a CSI report for at least one of the first resource set or the second resource set, in accordance with the determination.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
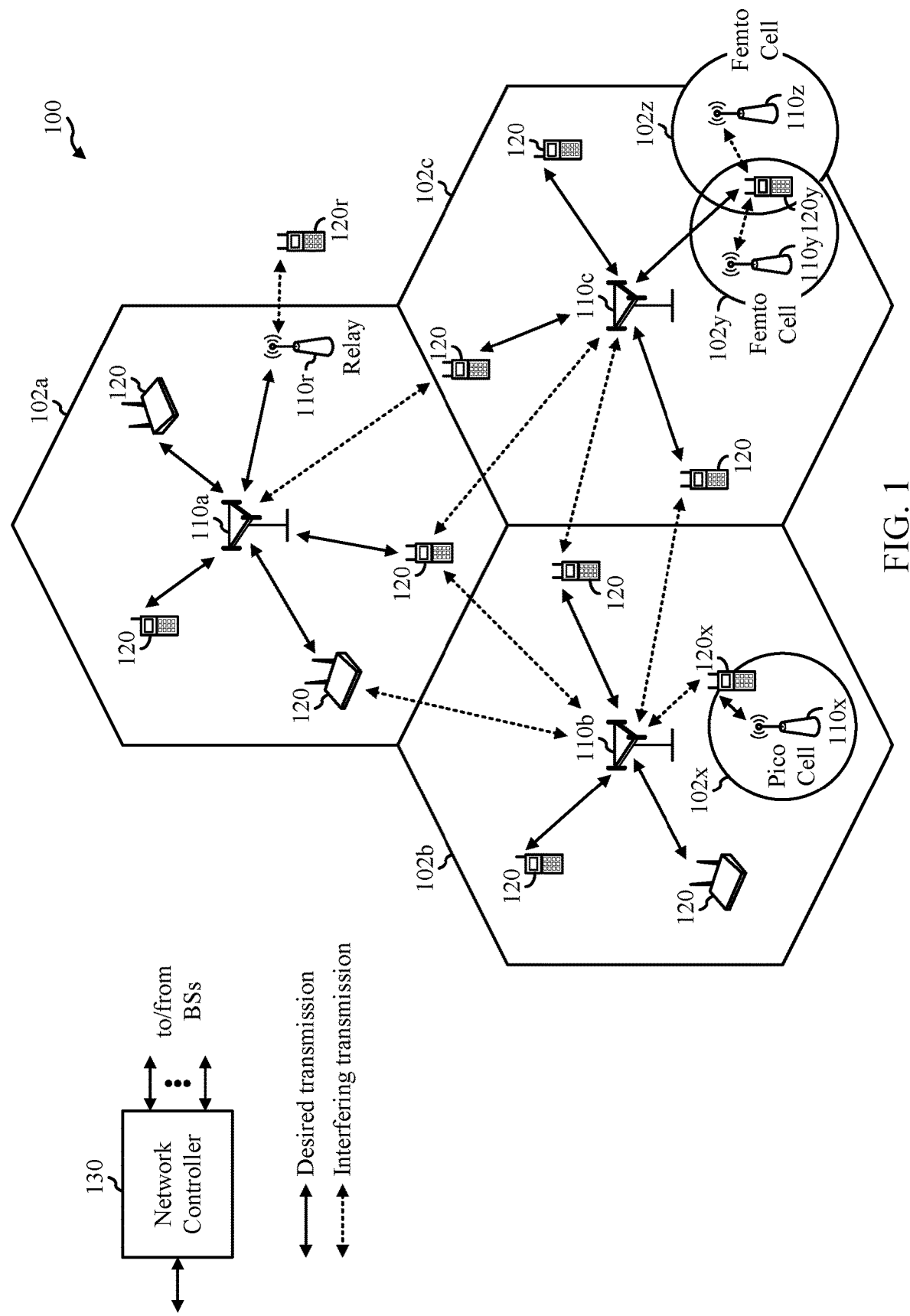
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, the network 100 may include one or more UEs 120 configured to perform operations 900 of FIG. 9 to measure and report channel state information (CSI). Similarly, the network 100 may include one or more base stations 110 configured to perform operations 1000 of FIG. 10 to configure a UE 120 for CSI reporting.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a health-care device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on cyclic prefix (CP) length. A slot may be further divided into mini-slots, each mini-slot having a smaller duration (e.g., containing fewer symbols than a full slot). Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
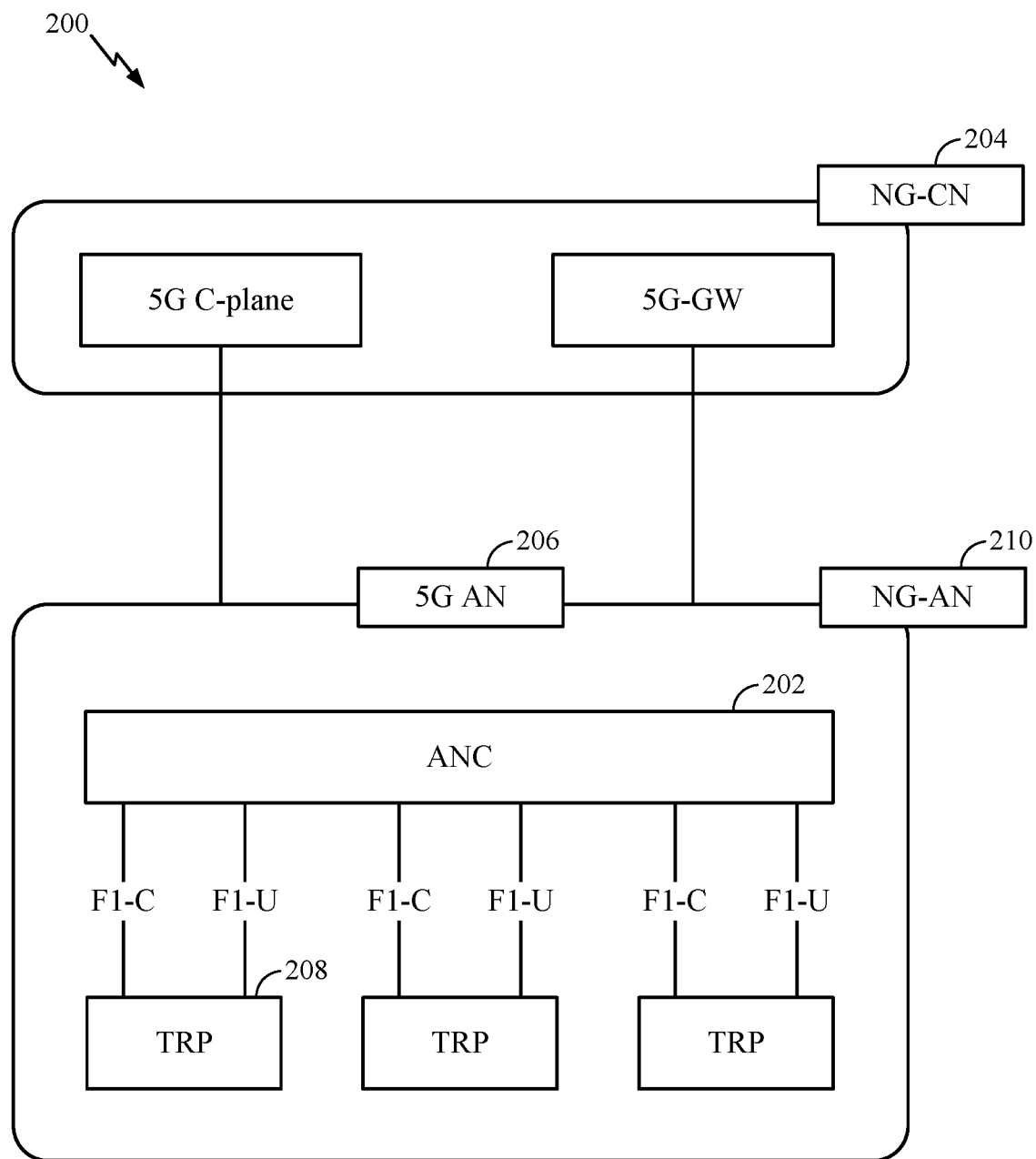
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
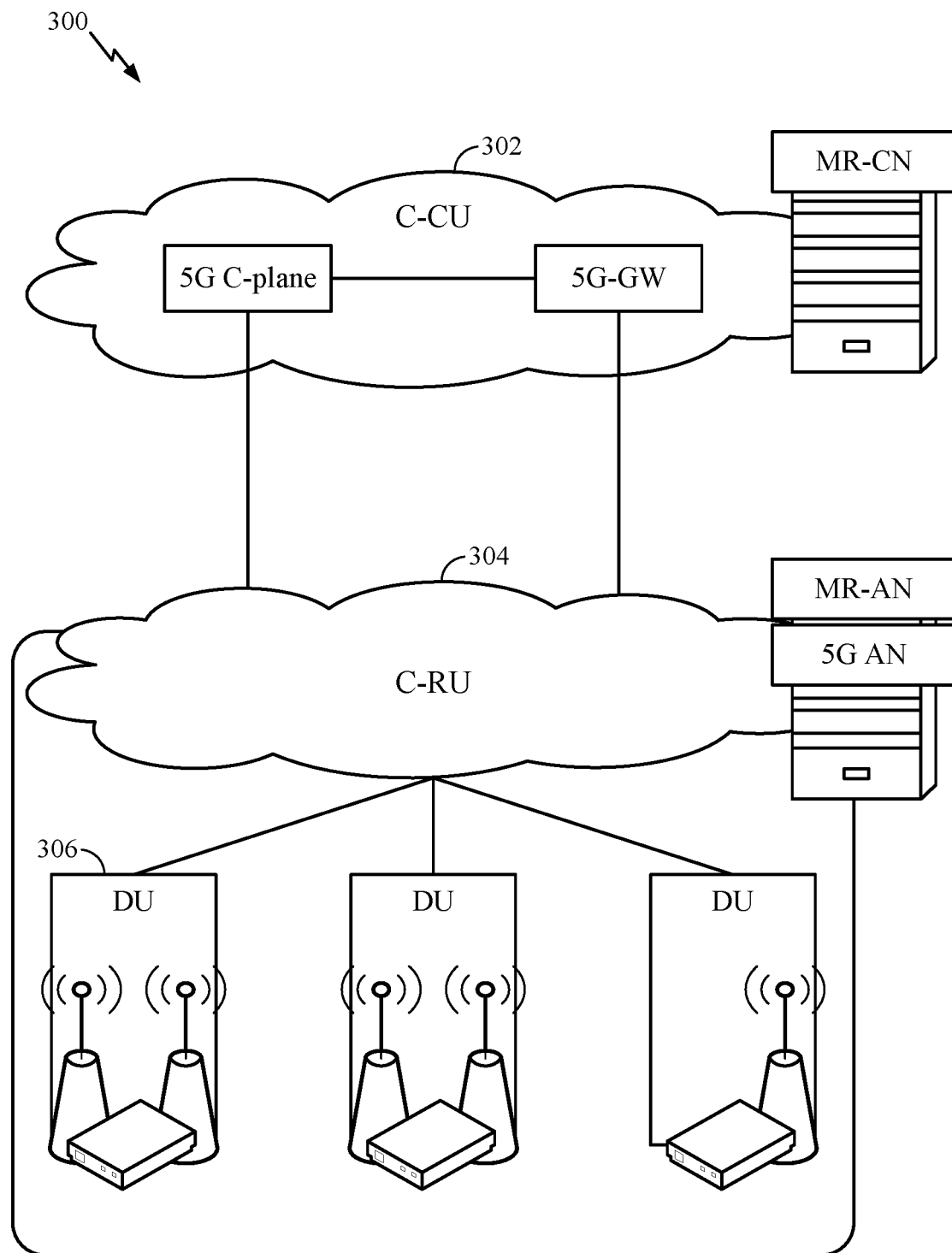
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
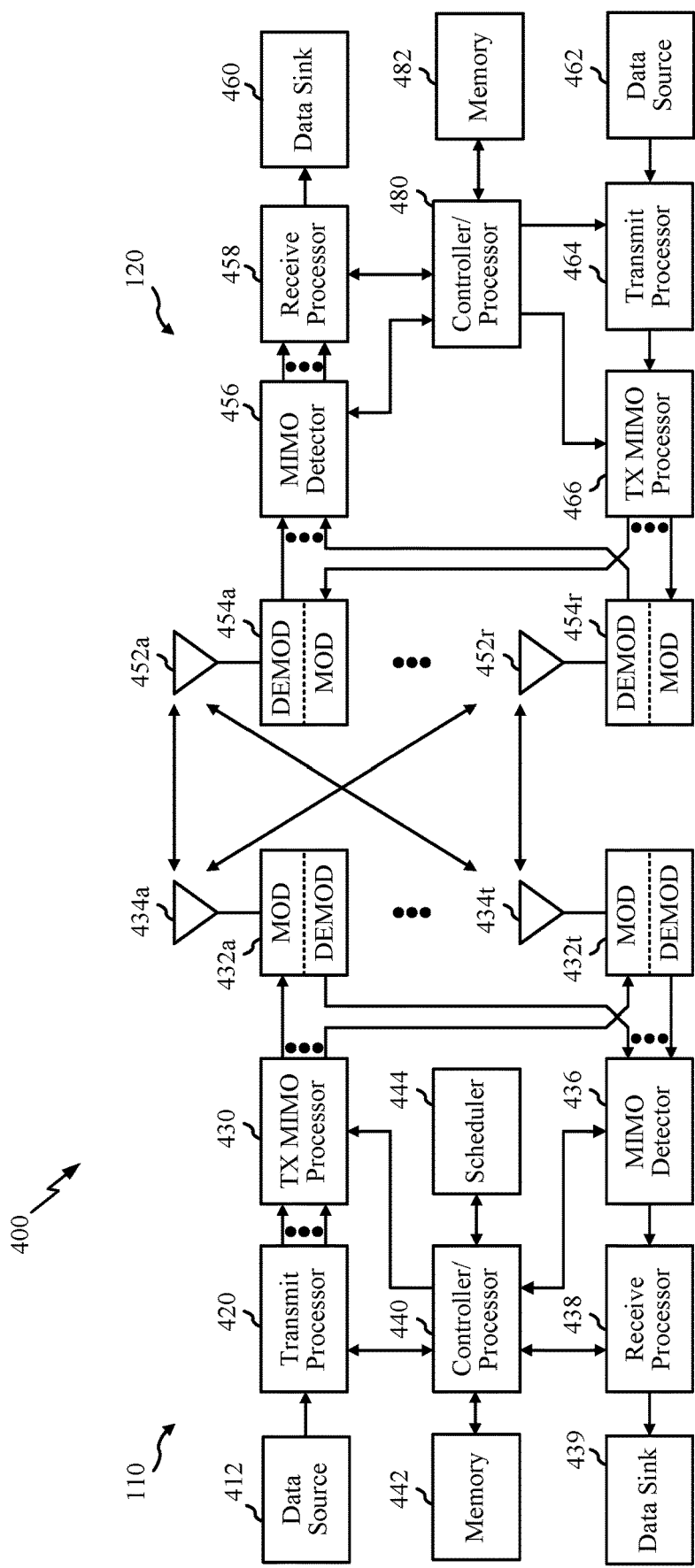
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 (used to implement transceiver or separate receiver and transmitter chain functions) of the UE 120 may be used to perform operations 900 of FIG. 9 and/or antennas 434, processors 430, 420, 438, and/or controller/processor 440 of the BS 110 may be used to perform operations 1000 of FIG. 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. As noted above, the processor 440 and/or other processors and modules at the base station 110 may perform or direct the processes for the techniques described herein with reference to FIG. 10. The processor 480 and/or other processors and modules at the UE 120 may also perform or direct processes for the techniques described herein with reference to FIG. 9. The memories 442 and 482 may store data and program codes for the BS 110 and the UE 120, respectively. A scheduler 444 may schedule UEs for data transmission on the downlink and/or uplink.

Figure 5:
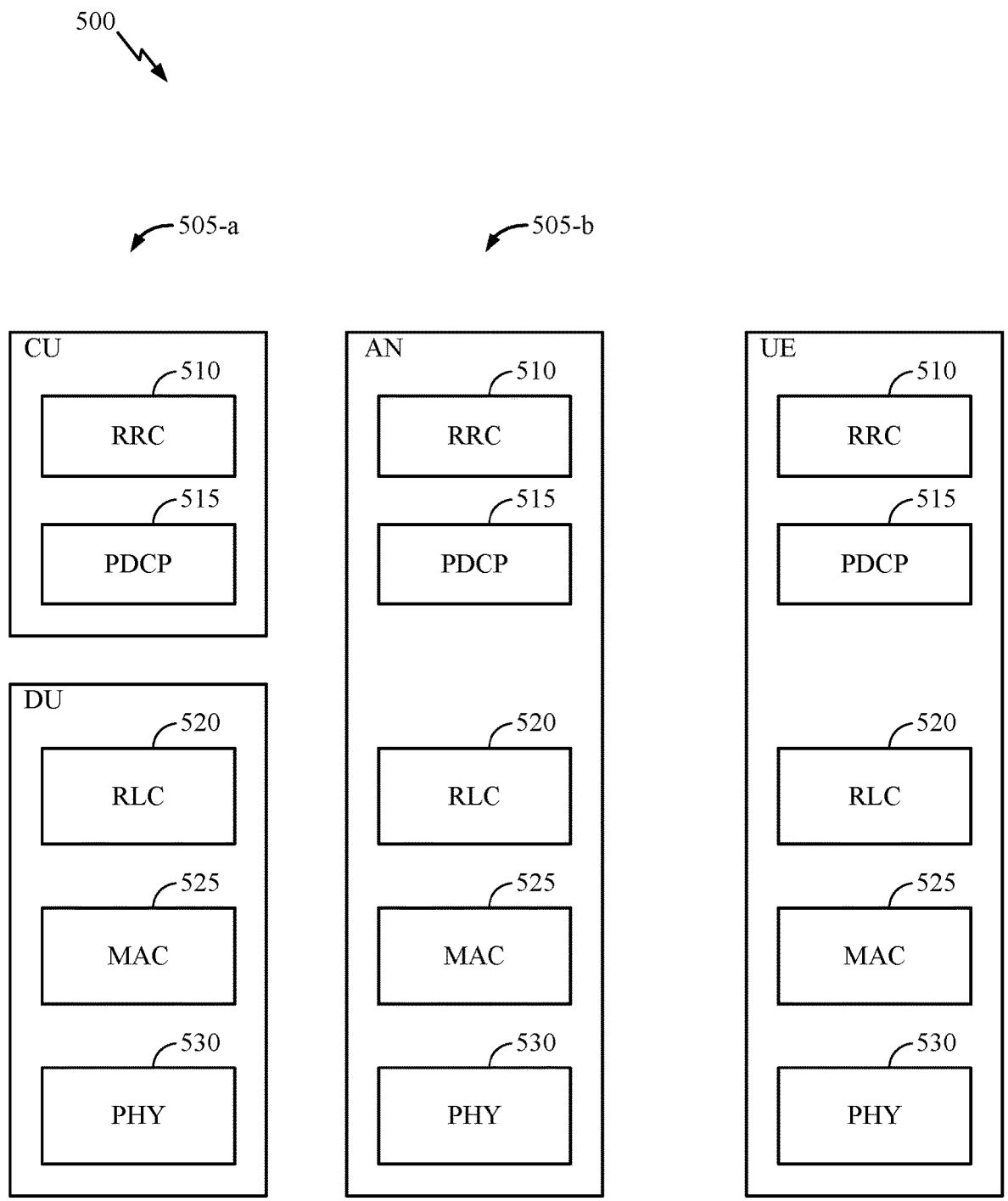
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
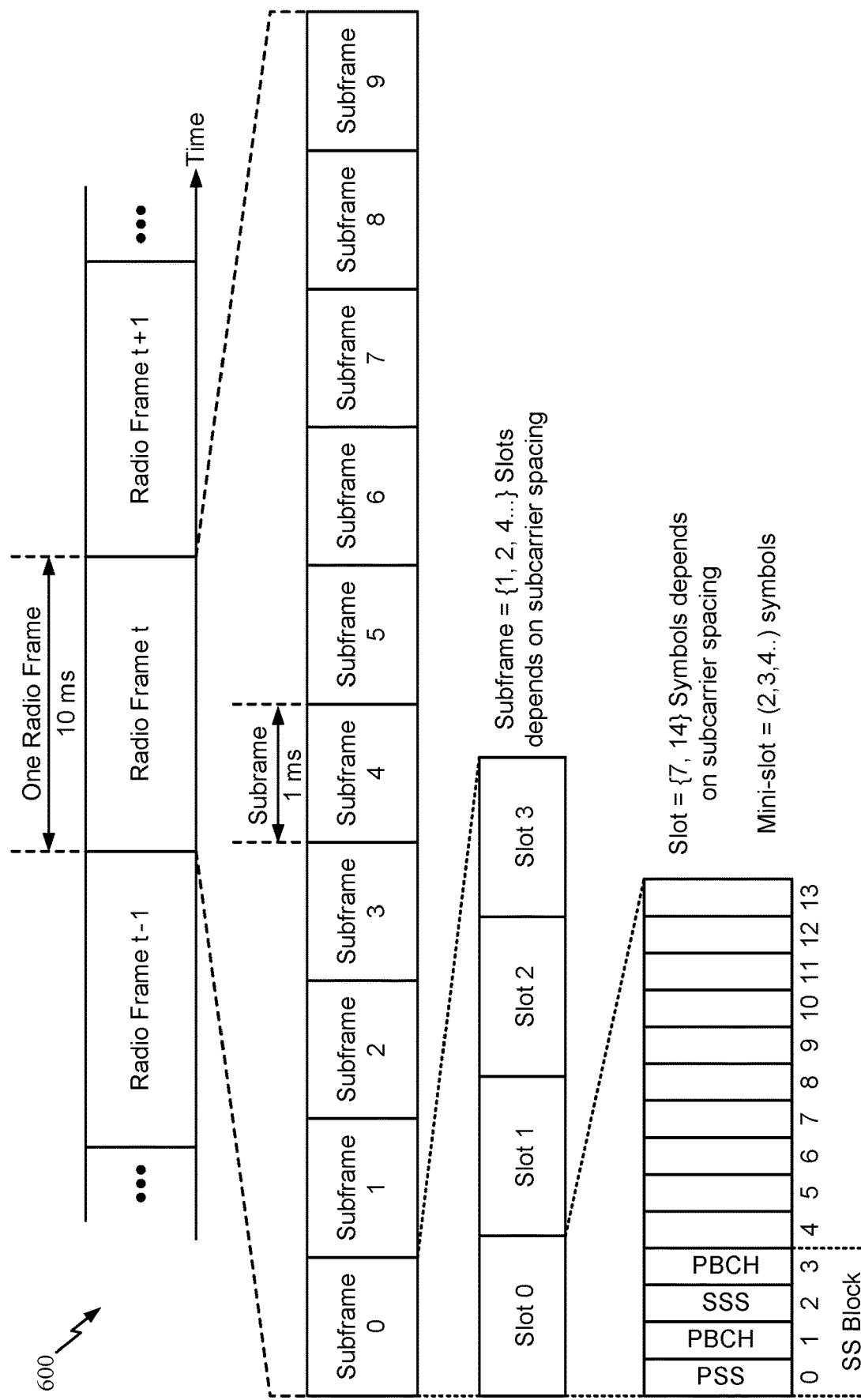
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example QCL Signaling

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide quasi-colocation (QCL) signaling for reference signals (RS) and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

As illustrated in FIG. 7, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
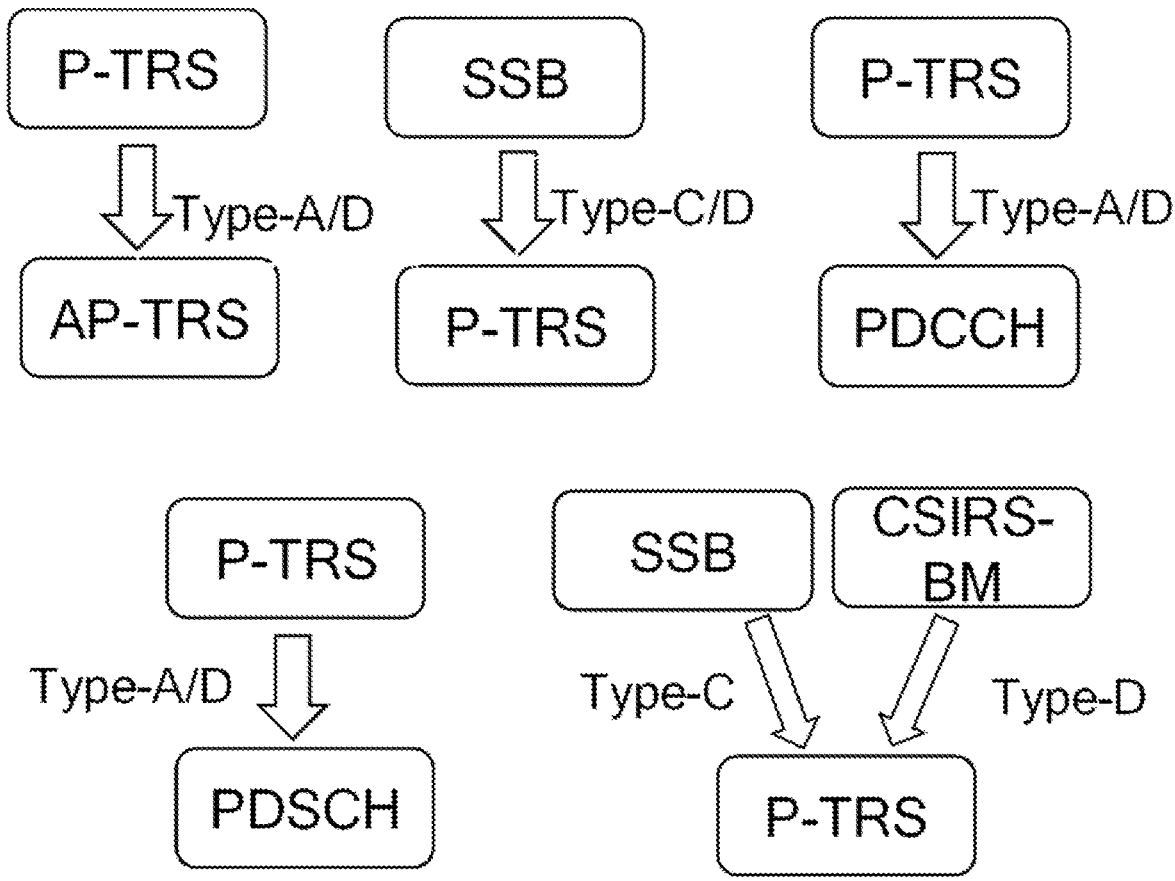
FIG. 8 graphically illustrates example QCL relationships between source and target reference signals.

FIG. 8 illustrate examples of the association of DL reference signals with corresponding QCL types that may be indicated by a TCI-RS-SetConfig.

In the examples of FIG. 8, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 8, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

Example CSI Measurement with Different QCL Configuration for a Same CSI-RS Resource Aspects of the present disclosure provide measuring and reporting channel state information based on CSI reference signals (CSI-RS) transmitted on a CSI-RS resource having different QCL configurations. In some cases, a UE may be configured to determine if a particular CSI reporting configuration is valid or invalid based on at least one condition.

In NR, a UE receives a trigger state in DCI triggering one or more aperiodic CSI reports. In each CSI report, an associated CSI resource set with one or more CSI-RS resources is triggered. All the triggered CSI reports triggered by the same trigger state are typically transmitted in the same UL slot.

An aperiodic CSI report links to a non-zero power (NZP) CSI-RS resource set with one or more NZP CSI-RS resources for channel measurement. In some cases, a same (common) NZP CSI-RS resource can be included in two resource sets. For example, res0 is included in both resource sets 1 and 2 in the following example CSI reporting configuration:

Report1→resource set 1={res0,1},
Report2→resource set 2={res0,2}.

As shown in the above example, a CSI-RS resource can be included in different resource set associated with different CSI reports. To support the CSI measurement, QCL information is provided per resource set, which generally means that all resources that belong to a particular resource set should use a common QCL configuration. The following example shows QCL information provided for the example resource sets introduced above:

Report1→resource set 1={res0,1} TCI state 0 (QCL ref-RS, QCL type),
Report2→resource set 2={res0,2} TCI state 1 (QCL ref-RS, QCL type).

where QCL ref-RS (reference RS) and QCL type generally means the CSI-RS resource is QCLed with a ref-RS in terms of a QCL type. In other words, a UE should use the QCL information obtained from a ref-RS to receive the corresponding CSI-RS. The ref-RS can be an SS block (SSB) or a periodic CSI-RS. The QCL type can be type A (Doppler shift, Doppler spread, average delay, delay spread), type B (Doppler shift, Doppler spread), type C (Doppler shift, average delay), or type D (spatial Rx parameter).

As illustrated by the example QCL configurations above, if a same CSI-RS resource is included in different resource sets, like res0 above, this resource can be configured with different QCL configuration.

Conventionally, when multiple resource sets are triggered by a same trigger state with the same trigger offset, then the UE is not expected to be configured with different QCL assumptions for the same CSI-RS resource associated with the multiple resource sets. Thus, such a configuration may be considered invalid. In other words, to be valid under this conventional approach, if resource set 1 and 2 are triggered with the same trigger offset (i.e., occur in the same slot), they must have same TCI state (e.g., TCI state 0 and 1 are not allowed for the same resource as in the example above).

The reason behind this restriction is that the UE is not expected to measure the same CSI-RS resource using different QCL assumptions in the same symbol of same slot (i.e., if triggering occurs in the same slot with the same triggering offset). For example, it may be a reasonable assumption that a UE cannot measure a same resource on a OFDM symbol with two different QCL assumptions (e.g., different assumptions regarding delay spread, Doppler, and/or spatial information).

Aspects of the present disclosure, however, address additional scenarios in which it may be beneficial to consider a CSI reporting configuration invalid. For example, it may be reasonable that a UE should not be expected to be configured with different QCL assumptions for that resource if the two multiple resource sets are transmitted on the same slot, even if the triggering does not occur in the same slot with the same triggering offset. For example, such scenarios may include aperiodic triggering in different slots, but with different triggering offsets, such that different QCL assumptions are configured for the same resource in the same slot.

Figure 9:
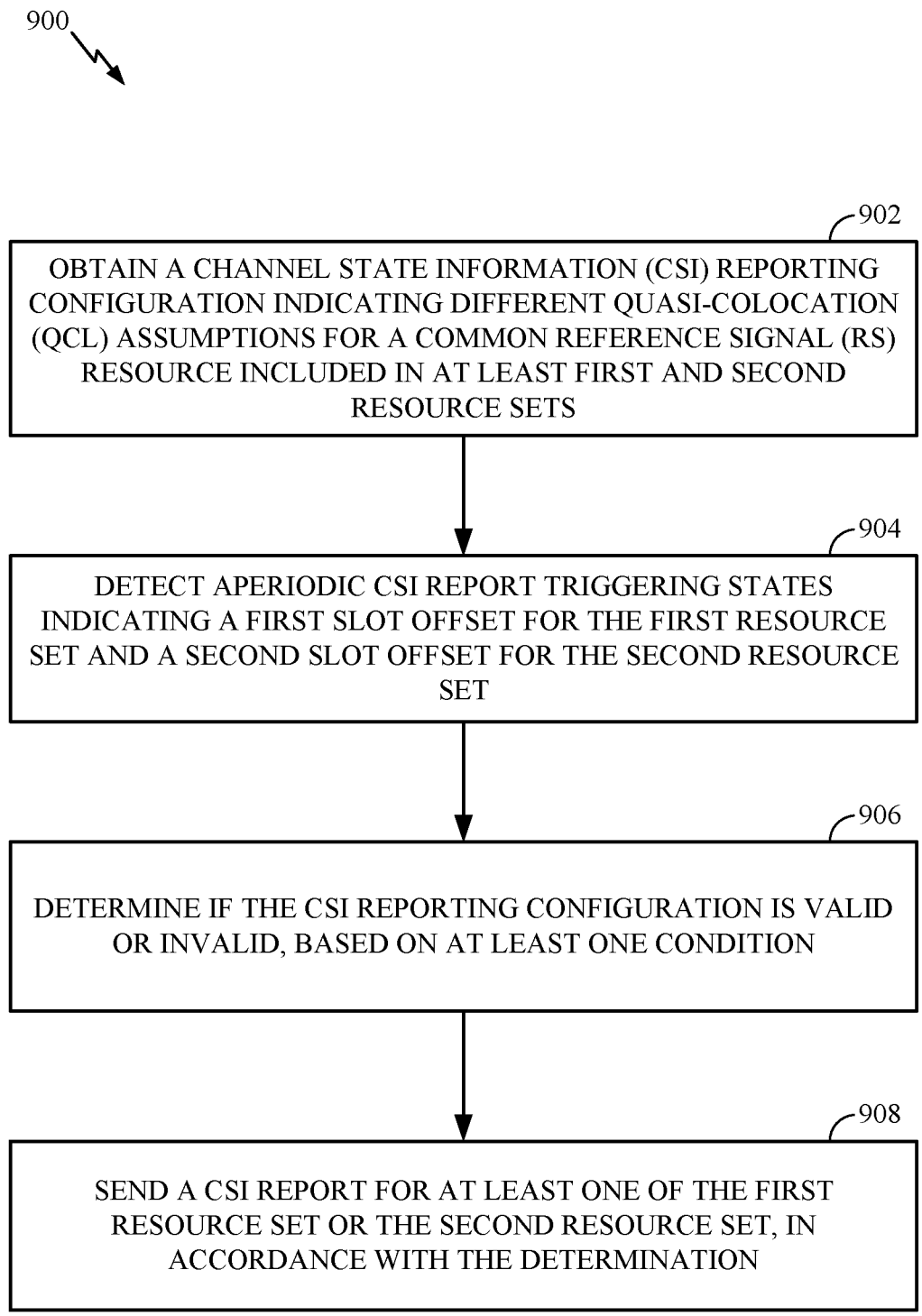
FIG. 9 illustrates example operations for wireless communications by a user equipment (UE), in accordance with aspects of the present disclosure.

FIG. 9 illustrates example operations 900 for wireless communications by a UE, in accordance with aspects of the present disclosure. For example, a UE 120 of FIG. 1 may perform operations 900 to determine if a CSI reporting configuration is valid and perform the reporting accordingly.

Operations 900 begin, at 902, by obtaining a channel state information (CSI) reporting configuration indicating different quasi-colocation (QCL) assumptions for a common reference signal (RS) resource included in at least first and second resource sets. At 904, the UE detects aperiodic CSI report triggering states indicating a first slot offset for the first resource set and a second slot offset for the second resource set. At 906, the UE determines if the CSI reporting configuration is valid or invalid, based on at least one condition. At 908, the UE sends a CSI report for at least one of the first resource set or the second resource set, in accordance with the determination.

Figure 10:
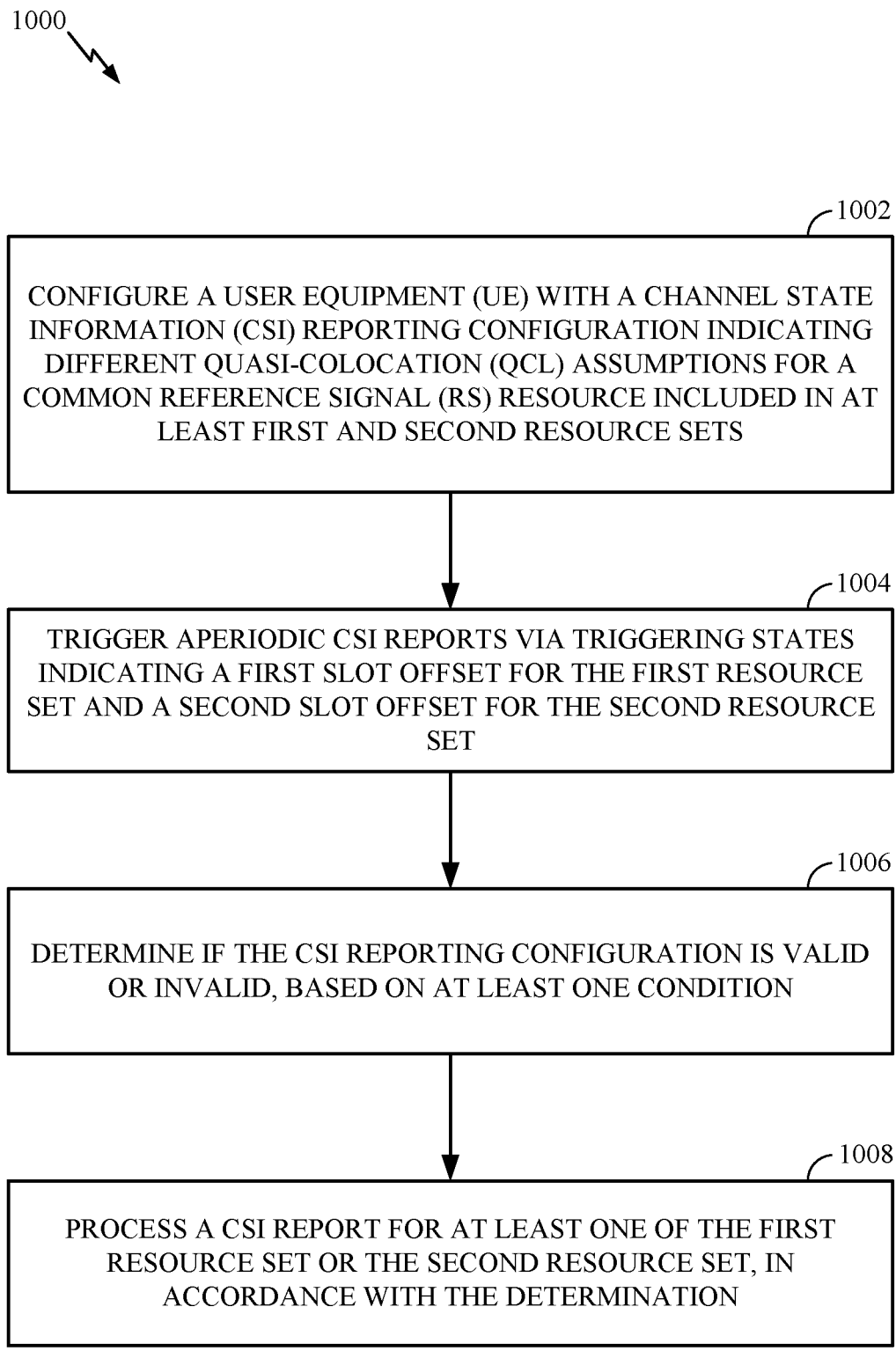
FIG. 10 illustrates example operations for wireless communications by a network entity, in accordance with aspects of the present disclosure.

FIG. 10 illustrates example operations 1000 for wireless communications by a network entity, in accordance with aspects of the present disclosure. For example, operations 1000 may be performed by a base station to configure a UE performing CSI reporting according to operations 900 described above and process CSI reports received therefrom.

Operations 1000 begin, at 1002, by configuring a user equipment (UE) with a channel state information (CSI) reporting configuration indicating different quasi-colocation (QCL) assumptions for a common reference signal (RS) resource included in at least first and second resource sets. At 1004, the BS triggers aperiodic CSI reports via triggering states indicating a first slot offset for the first resource set and a second slot offset for the second resource set. At 1006, the BS determines if the CSI reporting configuration is valid or invalid, based on at least one condition. At 1008, the BS processes a CSI report for at least one of the first resource set or the second resource set, in accordance with the determination.

In some cases, the at least one condition (for determining validity of the CSI reporting configuration) may be based on whether the aperiodic CSI reporting states result in the first and second resource sets occurring in the same slot for CSI measurement. There are various example scenarios in which two reports are triggered in different slots with different trigger offset, such that a same resource on a OFDM symbol with two different QCL configurations, such as the following:

Scenario 1: Report 0 can be triggered in slot m, and the resource set 0 offset is n-m, such that the report is sent in slot n; and Scenario 2: Report 1 can be triggered in slot m+1, and the resource set 1 offset is n-m-1, such that the report is sent in slot n.

In some cases, different slot offsets may result in the common RS resource occurring on different symbols. In such cases, the at least one condition (for determining validity of the CSI reporting configuration) may be based on a time gap between the different symbols. For example, a same resource in two resource sets occur in different OFDM symbols or slots, but the gap is very short, such as in the following example:

Resource set0 of report 0 can be triggered in slot m, and the resource set is in slot n; and Resource set1 of report 1 can be triggered in slot m, and the resource set is in a slot adjacent to slot n, such as slot n+1.

In this case, the UE still may not be able to perform the measurement as there may not be sufficient time for the UE to switch the QCL (e.g., spatial information) configuration and perform necessary processing in time to meet the reporting timing constraints.

In general, the techniques presented herein allow a UE to declare a non-valid configuration in cases where the UE should not expected to be configured with different TCI state for a same NZP CSI-RS resource associated with different resource sets. As described above, such cases include when two resource set occurs in the same slot or the same resource is configured with different TCI states on the same symbol.

In cases where the same resource in two resource sets occur in different OFDM symbols or slots, a UE may determine whether the QCL configuration is valid or invalid based on a timing threshold. For example, since the UE does not expect to be configured with different TCI state for a same NZP CSI-RS resource associated with different resource set, the UE may declare an invalid configuration when the gap between the two resource sets, or the gap between the two TCI state configurations, is below the timing threshold.

The timing threshold may be expressed in different units, such as a number of OFDM symbols ("symbol level") or a number of slots ("slot level"). The timing threshold may be determined in different ways (e.g., based on different factors). The timing threshold may be configured by a base station or fixed (e.g., in a standard specification). If configured by a base station, the timing threshold may be set based on UE processing capability (e.g., reported by a UE) and set to a value meant to ensure the UE has sufficient time to process CSI measurements and satisfy the reporting time constraints.

In some cases, the timing threshold may be determined by the QCL type (or QCL types) of the two resource sets. For example, if at least one QCL type contains spatial information (i.e., type D), then the UE may use a first timing threshold (timing threshold 1). If at least one QCL type does not contain spatial information (i.e., is not type D), then the UE may use a second timing threshold (timing threshold 2). For example, the second timing threshold may be less than the first timing threshold (threshold 2<threshold 1) if the UE does not have to update beam settings.

In some cases, the timing threshold may be determined by the number of ports of each resource and/or the report quantity (content) of the two CSI reports. For example, if the reported content is L1-RSRP, the UE may use threshold 1 if the reported content is CRI, RI, PMI, CQI, then the UE may use threshold 2. This approach may be used because the number of ports of each resource and the report quantity generally determines a number of processing units (PUs) of each report (and based on the number of processing units, the UE may determine the timing threshold).

The UE may determine how to report CSI, based on whether a QCL configuration for two CSI reports is determined as valid or invalid. For example, if a configuration is determined valid, then the UE may send both CSI reports. As noted above, a valid configuration may be declared when the gap between a common resource of the two resource sets, or the gap between the two TCI state configuration is greater than or equal to a timing threshold.

On the other hand, if a configuration is declared invalid for any reason (e.g., the gap is below the timing threshold), the UE may decide to drop or to not update one of the two CSI reports based on a priority rule. In some cases, the priority rule may be determined based on the type of the CSI report (e.g., whether periodic, semi-persistent, aperiodic), report quantity/content (e.g., L1-RSP, or CRI-RI-PMI . . . ), and/or the serving cell ID and/or report ID. Certain types of traffic and certain cells may have different reporting requirements (e.g., to achieve reliability, latency and/or throughput objectives). In the event one or more CSI reporting configurations are found invalid, the priority rules may, in effect, prioritize different types of traffic and/or traffic for certain cells.

Example Embodiments

Embodiment 1: A method for wireless communications by a user equipment (UE), comprising obtaining a channel state information (CSI) reporting configuration indicating different quasi-colocation (QCL) assumptions for a common reference signal (RS) resource included in at least first and second resource sets, detecting aperiodic CSI report triggering states indicating a first slot offset for the first resource set and a second slot offset for the second resource set, determining if the CSI reporting configuration is valid or invalid, based on at least one condition, and sending a CSI report for at least one of the first resource set or the second resource set, in accordance with the determination.

Embodiment 2: The method of Embodiment 1, wherein information regarding the QCL assumptions is indicated via transmission configuration information (TCI) states.

Embodiment 3: The method of any of Embodiments 1-2, wherein the at least one condition is based on whether the aperiodic CSI reporting states result in the first and second resource sets occurring in the same slot for CSI measurement.

Embodiment 4: The method of Embodiment 3, wherein the UE is configured to determine the CSI reporting configuration is invalid if CSI reporting for the first and second resource sets is triggered in different slots, but the first slot offset and second slot offset result in the common RS resource occurring on a same symbol.

Embodiment 5: The method of any of Embodiments 1-4, wherein the first slot offset and second slot offset result in the common RS resource occurring on different symbols and the at least one condition is based on a time gap between the different symbols.

Embodiment 6: The method of Embodiment 5, wherein the UE is configured to determine the CSI reporting configuration is invalid if the time gap between the different symbols is below a timing threshold.

Embodiment 7: The method of Embodiment 6, wherein the timing threshold is specified in units of OFDM symbols or slots.

Embodiment 8: The method of any of Embodiments 6-7, wherein the UE determines the timing threshold based on a configuration from a base station or based on a fixed value.

Embodiment 9: The method of any of Embodiments 6-8, wherein the timing threshold is determined, at least in part, by QCL types of the first and second resource sets.

Embodiment 10: The method of Embodiment 9, wherein a first timing threshold is used if a QCL type of at least one of the first or second resource sets contains spatial information or a second timing threshold is used if a QCL type of at least one of the first or second resource sets does not contain spatial information.

Embodiment 11: The method of any of Embodiments 6-10, wherein the timing threshold is determined by at least one of a number of ports of each of the first and second resource set or a report quantity of CSI reports for the first and second resource sets.

Embodiment 12: The method of any of Embodiments 6-11, wherein a number of ports of each of the first and second resource set and a report quantity of the CSI reports for the first and second resource sets determines a number of processing units of each of the CSI reports and the timing threshold is determined, at least in part, by the number of processing units of at least one of the first or second CSI reports.

Embodiment 13: The method of any of Embodiments 5-12, wherein the UE is configured to apply a priority rule to drop or refrain from updating a CSI report for one of the resource sets if the UE determines the CSI reporting configuration is invalid because the time gap between the different symbols is below a timing threshold.

Embodiment 14: The method of Embodiment 13, wherein the priority rule is determined based on at least one of a type of the CSI report, a report quantity, a serving cell ID, or a report ID.

Embodiment 15: A method for wireless communications by a network entity, comprising configuring a user equipment (UE) with a channel state information (CSI) reporting configuration indicating different quasi-colocation (QCL) assumptions for a common reference signal (RS) resource included in at least first and second resource sets, triggering aperiodic CSI reports via triggering states indicating a first slot offset for the first resource set and a second slot offset for the second resource set, determining if the CSI reporting configuration is valid or invalid, based on at least one condition, and receiving a CSI report for at least one of the first resource set or the second resource set, in accordance with the determination.

Embodiment 16: The method of Embodiment 15, wherein information regarding the QCL assumptions is indicated via transmission configuration information (TCI) states.

Embodiment 17: The method of any of Embodiments 15-16, wherein the at least one condition is based on whether the aperiodic CSI reporting states result in the first and second resource sets occurring in the same slot for CSI measurement.

Embodiment 18: The method of Embodiment 17, wherein determining the CSI reporting configuration is invalid if CSI reporting for the first and second resource sets is triggered in different slots, but the first slot offset and second slot offset result in the common RS resource occurring on a same symbol.

Embodiment 19: The method of any of Embodiments 15-18, wherein the first slot offset and second slot offset result in the common RS resource occurring on different symbols and the at least one condition is based on a time gap between the different symbols.

Embodiment 20: The method of Embodiment 19, wherein determining the CSI reporting configuration is invalid if the time gap between the different symbols is below a timing threshold.

Embodiment 21: The method of Embodiment 20, wherein the timing threshold is specified in units of OFDM symbols or slots.

Embodiment 22: The method of any of Embodiments 20-21, wherein configuring the UE the timing threshold or determining the threshold as a fixed value.

Embodiment 23: The method of any of Embodiments 20-22, wherein the timing threshold is determined, at least in part, by QCL types of the first and second resource sets.

Embodiment 24: The method of Embodiment 23, wherein a first timing threshold is used if a QCL type of at least one of the first or second resource sets contains spatial information or a second timing threshold is used if a QCL type of at least one of the first or second resource sets does not contain spatial information.

Embodiment 25: The method of any of Embodiments 20-24, wherein the timing threshold is determined by at least one of a number of ports of each of the first and second resource set or a report quantity of CSI reports for the first and second resource sets.

Embodiment 26: The method of any of Embodiments 20-25, wherein a number of ports of each of the first and second resource set and a report quantity of the CSI reports for the first and second resource sets determines a number of processing units of each of the CSI reports and the timing threshold is determined, at least in part, by the number of processing units of at least one of the first or second CSI reports.

Embodiment 27: The method of any of Embodiments 16-26, wherein based on a priority rule, the BS determines that a CSI report for one of the resource sets is dropped or not updated if the determining the CSI reporting configuration is invalid because the time gap between the different symbols is below a timing threshold.

Embodiment 28: The method of Embodiment 27, wherein the priority rule is determined based on at least one of a type of the CSI report, a report quantity, a serving cell ID, or a report ID.

Embodiment 29: An apparatus for wireless communications by a user equipment (UE), comprising means for obtaining a channel state information (CSI) reporting configuration indicating different quasi-colocation (QCL) assumptions for a common reference signal (RS) resource included in at least first and second resource sets, means for detecting aperiodic CSI report triggering states indicating a first slot offset for the first resource set and a second slot offset for the second resource set, means for determining if the CSI reporting configuration is valid or invalid, based on at least one condition, and means for sending a CSI report for at least one of the first resource set or the second resource set, in accordance with the determination.

Embodiment 30: An apparatus for wireless communications by a network entity, comprising means for configuring a user equipment (UE) with a channel state information (CSI) reporting configuration indicating different quasi-colocation (QCL) assumptions for a common reference signal (RS) resource included in at least first and second resource sets, means for triggering aperiodic CSI reports via triggering states indicating a first slot offset for the first resource set and a second slot offset for the second resource set, means for determining if the CSI reporting configuration is valid or invalid, based on at least one condition, and means for receiving a CSI report for at least one of the first resource set or the second resource set, in accordance with the determination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, operations 900 and 1000 of FIGS. 9 and 10 may be performed by various processors shown in FIG. 4. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    obtaining a channel state information (CSI) reporting configuration indicating different quasi-colocation (QCL) assumptions for a common reference signal (RS) resource included in at least first and second resource sets;
    detecting aperiodic CSI report triggering states indicating a first slot offset for the first resource set and a second slot offset for the second resource set;
    determining if the CSI reporting configuration is valid or invalid, based on at least one condition; and
    sending a CSI report for at least one of the first resource set or the second resource set, in accordance with the determination.

2. The method of claim 1, wherein information regarding the QCL assumptions is indicated via transmission configuration information (TCI) states.

3. The method of claim 1, wherein the at least one condition is based on whether the aperiodic CSI reporting states result in the first and second resource sets occurring in the same slot for CSI measurement.

4. The method of claim 3, wherein the UE is configured to determine the CSI reporting configuration is invalid if CSI reporting for the first and second resource sets is triggered in different slots, but the first slot offset and second slot offset result in the common RS resource occurring on a same symbol.

5. The method of claim 1, wherein:
    the first slot offset and second slot offset result in the common RS resource occurring on different symbols; and
    the at least one condition is based on a time gap between the different symbols.

6. The method of claim 5, wherein the UE is configured to determine the CSI reporting configuration is invalid if the time gap between the different symbols is below a timing threshold.

7. The method of claim 6, wherein the timing threshold is specified in units of OFDM symbols or slots.

8. The method of claim 6, wherein the UE determines the timing threshold based on a configuration from a base station or based on a fixed value.

9. The method of claim 6, wherein the timing threshold is determined, at least in part, by QCL types of the first and second resource sets.

10. The method of claim 9, wherein:
    a first timing threshold is used if a QCL type of at least one of the first or second resource sets contains spatial information; or
    a second timing threshold is used if a QCL type of at least one of the first or second resource sets does not contain spatial information.

11. The method of claim 6, wherein the timing threshold is determined by at least one of:
    a number of ports of each of the first and second resource set; or
    a report quantity of CSI reports for the first and second resource sets.

12. The method of claim 6, wherein:
    a number of ports of each of the first and second resource set and a report quantity of the CSI reports for the first and second resource sets determines a number of processing units of each of the CSI reports; and
    the timing threshold is determined, at least in part, by the number of processing units of at least one of the first or second CSI reports.

13. The method of claim 5, wherein the UE is configured to apply a priority rule to drop or refrain from updating a CSI report for one of the resource sets if the UE determines the CSI reporting configuration is invalid because the time gap between the different symbols is below a timing threshold.

14. The method of claim 13, wherein the priority rule is determined based on at least one of a type of the CSI report, a report quantity, a serving cell ID, or a report ID.

15. A method for wireless communications by a network entity, comprising:
    configuring a user equipment (UE) with a channel state information (CSI) reporting configuration indicating different quasi-colocation (QCL) assumptions for a common reference signal (RS) resource included in at least first and second resource sets;
    triggering aperiodic CSI reports via triggering states indicating a first slot offset for the first resource set and a second slot offset for the second resource set;
    determining if the CSI reporting configuration is valid or invalid, based on at least one condition; and
    receiving a CSI report for at least one of the first resource set or the second resource set, in accordance with the determination.

16. The method of claim 15, wherein information regarding the QCL assumptions is indicated via transmission configuration information (TCI) states.

17. The method of claim 15, wherein the at least one condition is based on whether the aperiodic CSI reporting states result in the first and second resource sets occurring in the same slot for CSI measurement.

18. The method of claim 17, wherein determining the CSI reporting configuration is invalid if CSI reporting for the first and second resource sets is triggered in different slots, but the first slot offset and second slot offset result in the common RS resource occurring on a same symbol.

19. The method of claim 15, wherein:
    the first slot offset and second slot offset result in the common RS resource occurring on different symbols; and
    the at least one condition is based on a time gap between the different symbols.

20. The method of claim 19, wherein determining the CSI reporting configuration is invalid if the time gap between the different symbols is below a timing threshold.

21. The method of claim 20, wherein the timing threshold is specified in units of OFDM symbols or slots.

22. The method of claim 20, wherein configuring the UE the timing threshold or determining the threshold as a fixed value.

23. The method of claim 20, wherein the timing threshold is determined, at least in part, by QCL types of the first and second resource sets.

24. The method of claim 23, wherein:
a first timing threshold is used if a QCL type of at least one of the first or second resource sets contains spatial information; or
a second timing threshold is used if a QCL type of at least one of the first or second resource sets does not contain spatial information.

25. The method of claim 20, wherein the timing threshold is determined by at least one of:
a number of ports of each of the first and second resource set; or
a report quantity of CSI reports for the first and second resource sets.

26. The method of claim 20, wherein:
a number of ports of each of the first and second resource set and a report quantity of the CSI reports for the first and second resource sets determines a number of processing units of each of the CSI reports; and
the timing threshold is determined, at least in part, by the number of processing units of at least one of the first or second CSI reports.

27. The method of claim 19, wherein based on a priority rule, the BS determines that a CSI report for one of the resource sets is dropped or not updated if the determining the CSI reporting configuration is invalid because the time gap between the different symbols is below a timing threshold.

28. The method of claim 27, wherein the priority rule is determined based on at least one of a type of the CSI report, a report quantity, a serving cell ID, or a report ID.

29. An apparatus for wireless communications by a user equipment (UE), comprising:
means for obtaining a channel state information (CSI) reporting configuration indicating different quasi-colocation (QCL) assumptions for a common reference signal (RS) resource included in at least first and second resource sets;
means for detecting aperiodic CSI report triggering states indicating a first slot offset for the first resource set and a second slot offset for the second resource set;
means for determining if the CSI reporting configuration is valid or invalid, based on at least one condition; and
means for sending a CSI report for at least one of the first resource set or the second resource set, in accordance with the determination.

30. An apparatus for wireless communications by a network entity, comprising:
means for configuring a user equipment (UE) with a channel state information (CSI) reporting configuration indicating different quasi-colocation (QCL) assumptions for a common reference signal (RS) resource included in at least first and second resource sets;
means for triggering aperiodic CSI reports via triggering states indicating a first slot offset for the first resource set and a second slot offset for the second resource set;
means for determining if the CSI reporting configuration is valid or invalid, based on at least one condition; and
means for receiving a CSI report for at least one of the first resource set or the second resource set, in accordance with the determination.

* * * * *